US012812032B2

(12) United States Patent
Dotten et al.

(10) Patent No.: US 12,812,032 B2
(45) Date of Patent: Nov. 24, 2026

(54) METHOD FOR REMOTELY ACTIVATING AN ELECTROMECHANICAL APPARATUS

(71) Applicant: 2390389 ONTARIO INC., Ottawa (CA)

(72) Inventors: Robert Dotten, Richmond (CA); Ke Wang, Ottawa (CA); Benoit Rene Cote, Gatineau (CA); Joshua Grimard, Gatineau (CA)

( * ) Notice: Subject to any disclaimer, the term of this patent is extended or adjusted under 35 U.S.C. 154(b) by 384 days.

(21) Appl. No.: 18/276,425

(22) PCT Filed: Oct. 1, 2021

(86) PCT No.: PCT/CA2021/051379

§ 371 (c)(1),
(2) Date: Aug. 8, 2023

(87) PCT Pub. No.: WO2022/170415

PCT Pub. Date: Aug. 18, 2022

(65) Prior Publication Data

US 2024/0121336 A1 Apr. 11, 2024

Related U.S. Application Data

(60) Provisional application No. 63/147,651, filed on Feb. 9, 2021.

(51) Int. Cl.
*H04M 1/72412* (2021.01)
*H04M 1/72406* (2021.01)

(52) U.S. Cl.
CPC ... *H04M 1/72412* (2021.01); *H04M 1/72406* (2021.01)

(58) Field of Classification Search
CPC .................. H04L 2012/2841; H04M 1/72412
See application file for complete search history.

(56) References Cited

U.S. PATENT DOCUMENTS

| | | | | |
|---|---|---|---|---|
| 2003/0159890 A1* | 8/2003 | Schuster | B66B 1/468 187/247 |
| 2017/0084102 A1 | 3/2017 | Szymke et al. | |
| 2017/0355554 A1* | 12/2017 | Eleid | B66B 1/3461 |
| 2019/0193989 A1 | 6/2019 | Huang et al. | |
| 2020/0081662 A1* | 3/2020 | Ito | G06F 3/1226 |
| 2021/0075637 A1* | 3/2021 | Madonna | H04L 12/282 |
| 2021/0094796 A1* | 4/2021 | Mirza | G06F 3/017 |

FOREIGN PATENT DOCUMENTS

WO 2012093985 A1 7/2012

* cited by examiner

*Primary Examiner* — Fabricio R Murillo Garcia
(74) *Attorney, Agent, or Firm* — McMillan LLP

(57) ABSTRACT

A system adapting an elevating device for wireless remote operation from a mobile device is disclosed. The system includes a first interface for connecting to a panel of the elevator, the panel comprising at least one elevator button, the module comprising a relay switch interconnected to the elevator button; a transceiver for receiving command data wirelessly from the mobile device, the transceiver interconnected to the first interface, and a controller interconnected to the interface and to the transceiver. In response to receiving the command data through the transceiver, the controller sends a corresponding command signal via said interface to the panel by activating the relay switch.

11 Claims, 17 Drawing Sheets

METHOD FOR REMOTELY ACTIVATING AN ELECTROMECHANICAL APPARATUS

TECHNICAL FIELD

The present disclosure relates to a method for enabling accessibility of devices associated with movement of people generally, and more particularly to a method for remotely activating electromechanical apparatuses.

BACKGROUND

Many cities, provinces, countries and other types of jurisdictions provide, or at least aim to provide, a wide range of opportunities and experiences free of limitations for their residents and visitors. For people with disabilities however, the environment, infrastructure, buildings and associated walkways, elevators, doors and other structures and devices impose numerous obstacles that limit their ability to move about freely and safely without concern.

In recognition of this fact, many jurisdictions are adopting policies to make themselves fully accessible to all residents and visitors. This typically involves new accessibility design guidelines, retrofitting existing structures, and audits of all city-owned buildings.

Existing attempts at solving these problems of access include helping visually handicapped persons, who cannot see a destination floor shown or a call registration button provided on a panel of an elevator, by making these functions available via voice recognition. Other solutions utilize Braille on the panel. However, these solutions are not always suitable. For example, voice recognition may be difficult to implement in environments where ambient noise level is high. Braille is similarly cumbersome and does not provide much help to persons whose disability is not related to visual impairment.

In addition, highly contagious diseases such as the common cold, the flu or COVID-19 are making the ability to avoid physical interaction with common physical interfaces such as buttons on elevators and power doors, highly desirable, even for people who have no disabilities.

Although attempts have been made at remote control of elevator devices, more general improvements are desired.

SUMMARY

In accordance with an aspect of the present invention there is provided, a method for remotely operating an electromechanical apparatus via a wireless network. The method includes (a) providing a device configured to electrically couple to the electromechanical apparatus: (i) the electromechanical apparatus includes a panel having at least one operating button interconnected to a relay switch, the operating button for operating the electromechanical apparatus; (ii) the device including: (A) a control interface configured for electrical coupling to a panel of the electromechanical apparatus; (B) a transceiver configured to receive command data wirelessly from a mobile device, the transceiver interconnected to the control interface, the command data for use in operating and controlling the electromechanical apparatus; and (C) a controller interconnected to the control interface and to the transceiver; (b) electrically coupling the control interface to the panel; and (c) providing a mobile application that is downloadable to the mobile device and that is configured to receive and access data pertaining to the operation and control of the electromechanical apparatus; wherein the mobile application is configured to instruct the mobile device to transmit the command data wirelessly to the transceiver, and wherein a microcontroller of the device is configured to, upon the transceiver receiving the command data, send a corresponding command signal to the panel to operate the relay switch.

This summary does not necessarily describe the entire scope of all aspects of the disclosure. Other aspects, features and advantages will be apparent to those of ordinary skill in the art upon review of the following description of specific embodiments.

BRIEF DESCRIPTION OF DRAWINGS

In the accompanying figures, which illustrate by way of example only, one or more embodiments of the present invention.

DETAILED DESCRIPTION

Figure 1:
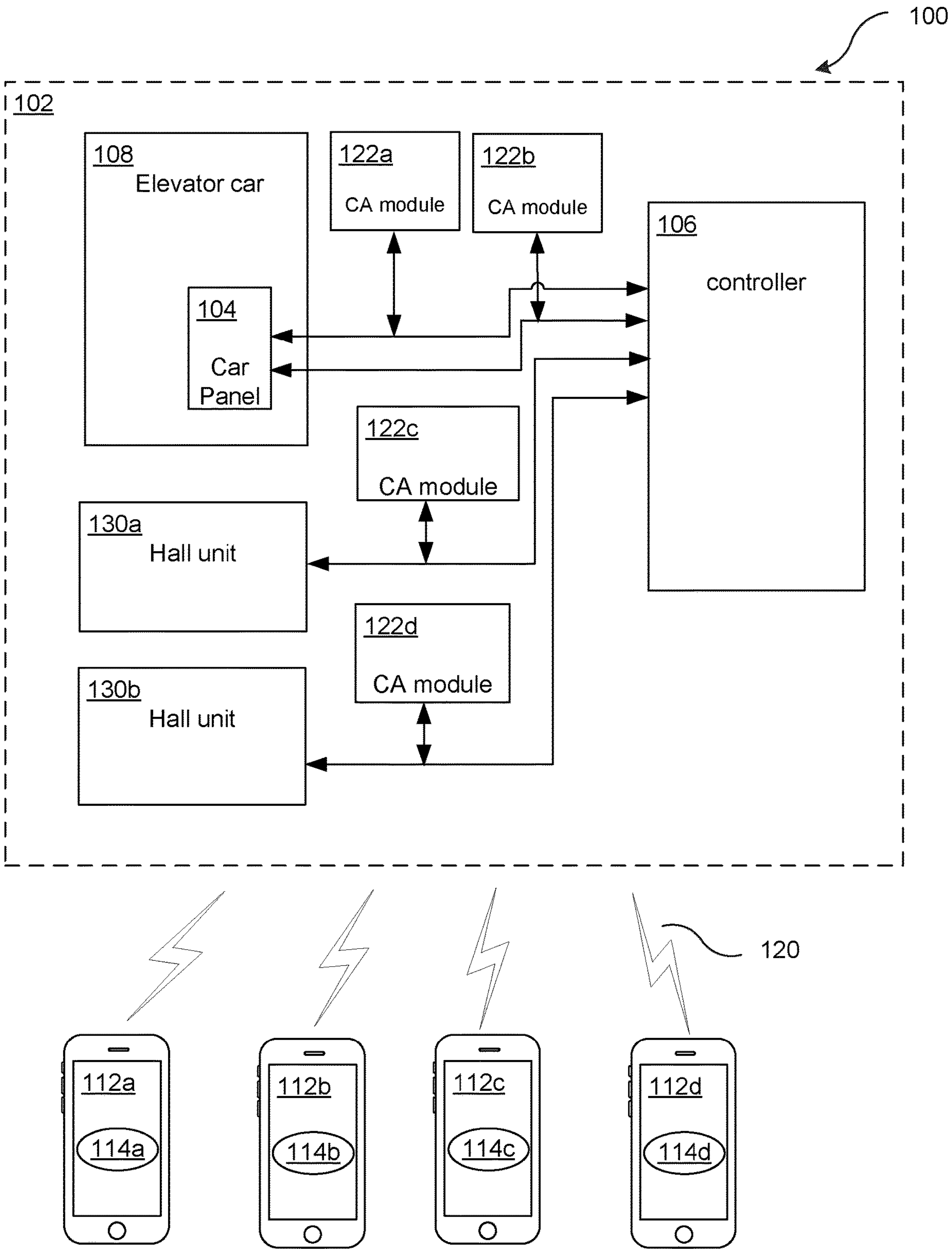
FIG. 1 is a schematic system block diagram of an elevator system, according to a first embodiment of the present invention.

Directional terms such as “top,” “bottom,” “upwards,” “downwards,” “vertically,” and “laterally” are used in the following description for the purpose of providing relative reference only, and are not intended to suggest any limitations on how any article is to be positioned during use, or to be mounted in an assembly or relative to an environment. The use of the word “a” or “an” when used herein in conjunction with the term “comprising” may mean “one,” but it is also consistent with the meaning of “one or more,” “at least one” and “one or more than one.” Any element expressed in the singular form also encompasses its plural form. Any element expressed in the plural form also encompasses its singular form. The term “plurality” as used herein means more than one, for example, two or more, three or more, four or more, and the like.

In this disclosure, the term “app” means a customized software application.

In this disclosure, the terms “comprising”, “having”, “including”, and “containing”, and grammatical variations thereof, are inclusive or open-ended and do not exclude additional, un-recited elements and/or method steps. The term "consisting essentially of" when used herein in connection with a composition, use or method, denotes that additional elements, method steps or both additional elements and method steps may be present, but that these additions do not materially affect the manner in which the recited composition, method, or use functions. The term "consisting of" when used herein in connection with a composition, use, or method, excludes the presence of additional elements and/or method steps.

In this disclosure, the term "electromechanical apparatus" means an apparatus comprising both electrical and mechanical components that can be activated to be displaced from a first position to a second position. Non-limiting examples of electromechanical apparatuses include elevators, escalators, powered doors, and automated swing doors.

An aspect of the present disclosure relates to a system designed to adapt an electromechanical apparatus for intelligent remote operation from a wireless mobile device such as a smartphone or a cell phone running a corresponding custom mobile application or app. The system includes a module that is installed in and electrically coupled to an existing electromechanical apparatus. The operation of the system augments the existing operation of the electromechanical apparatus without necessarily affecting the electromechanical apparatus's traditional modes of operation. For example, a traditional mode of operating an elevator is via the elevator panel, and a traditional mode of operating a powered door is via pressing a push switch. The system also includes the mobile device running the custom app.

The wireless mobile device includes a transceiver capable of sending and receiving wireless signals. In response to a command initiated by the app, the wireless mobile device causes a wireless signal to be sent via a defined channel to the module.

The module also includes a transceiver with an input interface for receiving a wireless signal from the mobile app. The app executing on the wireless mobile device instructs the device to send wireless signals that correspond to commands for operating the electromechanical apparatus.

In specific embodiments, the wireless signals exchanged between the wireless mobile device and the module of the system are Bluetooth signals, particularly Bluetooth Low Energy (BLE) signals. In response to a command initiated by the app, the wireless mobile device causes a BLE signal to be sent via a BLE channel. In such embodiments of the system, the module also includes a Bluetooth transceiver with an input for receiving a Bluetooth or BLE signal.

The module has one or more relay switches that are each electrically coupled to a generic contact relay of traditional mode of operation of the electromechanical apparatus (e.g. an elevator button for an elevator, or to a contact relay of an accessible power door operator button for a powered door). In response to receiving a Bluetooth command signal through the input, the module activates a relay switch.

By closing the contact relay, the module effectively achieves the same effect as a physical push of the button. The module, together with the wireless mobile device running the app allow a user to operate an electromechanical apparatus wirelessly via the wireless mobile device.

Embodiment I—Elevator System

Elevator System Architecture

FIG. 1 depicts a simplified block diagram according to an embodiment of an elevator system 100. As depicted in FIG. 1, the elevator system 100 includes an elevator 102 having at least one car 108 controlled by a controller 106. The elevator system 100 also includes a plurality of contactless access modules 122*a*, 122*b*, 122*c*, 122*d* (individually and collectively—modules 122) and a panel 104 that includes a plurality of buttons (not shown in FIG. 1).

The panel 104 includes a control interface for electrical, mechanical or data communication with the controller 106 which in turn provides control of the elevator car 108. The control interface can be any interface that is known in the art.

Panel 104 is sometimes called a car operating panel/station and is typically mounted within the car 108. Panel 104 mounted in the car 108 contains car operating controls in the form of a plurality of buttons (not shown) such as call register buttons, door open, door close, alarm, emergency stop, other buttons or key switches are required for operating the elevator. The car operating panel/station can also be any panel that is known in the art.

One or more hallways, having elevator calling hall units 130*a*, 130*b* (individually and collectively units 130) interconnect with the controller 106 to provide control or calling signals. In the depicted embodiment, the signal from unit 130*a* may be equivalently provided by module 122*c* to controller 106. Similarly, signal from unit 130*b* to controller 106 may be equivalently provided by module 122*d*.

As will be discussed with reference to FIG. 2, each module 122 includes a control interface 110 and a wireless interface 116. In this embodiment, the control interface 110 is used to communicate with controller 106 while the wireless interface 116 provide a wireless data communication interface with a plurality of electronic devices each equipped with a suitable corresponding wireless transceiver.

In the depicted embodiment shown in FIG. 1, module 122 provides a communication interface between the one or more electronic devices 112*a* to 112*d* (individually and collectively, "devices 112") via a wireless channel 120.

As contemplated in this embodiment, wireless channel 120 is a Bluetooth channel. In other embodiments, the network can be any other suitable network including, but not limited to, a cellular data network, Wi-Fi™, Bluetooth™, WiMax™, IEEE 802.16 (WirelessMAN), and any suitable alternative thereof. The suitable data communications interface contemplated in this embodiment between devices 112 and channel 120 is wireless. The interface can be an antenna, a Bluetooth™ transceiver, a Wi-Fi™ adapter, or a combination thereof.

As contemplated in this embodiment, devices 112 are handheld electronic devices. Non-limiting examples of handheld electronic devices include personal digital assistant (PDA), cellular telephone, smartphone (e.g. iPhone™, Blackberry™, Windows™ Phone), media player (e.g. iPod™), and a device which combines one or more aspects or functions of the foregoing devices. In other embodiments, the devices can be any other suitable electronic devices having a suitable data communications interface to channel 120.

Devices 112 may be used by the users of elevator system 100 including, but not limited to, calling an elevator and specifying the floor to which the user wishes to go.

Each device 112 is equipped with an app 114 (shown as apps 114*a* to 114*d* in FIG. 1). As contemplated in this first embodiment, apps 114 communicate with server software 108 via channel 120.

Wireless Channel—Bluetooth

Bluetooth wireless technology is a short-range communications system intended to replace cables connecting portable and/or fixed electronic devices. The key features of Bluetooth wireless technology are robustness, low power consumption, and low cost.

There are two forms of Bluetooth wireless technology systems: Basic Rate (BR) and Bluetooth Low Energy (BLE). Both systems include device discovery, connection establishment and connection mechanisms. The Basic Rate system includes optional Enhanced Data Rate (EDR), Alternate Media Access Control (MAC) and Physical (PHY) layer extensions. The Basic Rate system offers synchronous and asynchronous connections with data rates of 721.2 kb/s for Basic Rate, 2.1 Mb/s for Enhanced Data Rate and high speed operation up to 54 Mb/s with the 802.11 AMP (i.e., Alternate MAC/PHY).

BLE devices operate in the unlicensed 2.4 GHz ISM (Industrial Scientific Medical) band. A frequency hopping transceiver is used to combat interference and fading. BLE includes features designed to enable products that require lower current consumption, lower complexity and lower cost than BR/EDR. The BLE system is designed for applications with lower data rates and has lower duty cycles.

The BLE system includes an optional 2 Mb/s physical layer data rate and also offers isochronous data transfer in a connection-oriented and connectionless mechanism that uses the isochronous transports. Depending on the use case or application, one system including any optional parts may be more optimal than the other.

Devices implementing both systems can communicate with other devices implementing both systems as well as devices implementing either system. Some profiles and use cases will be supported by only one of the systems.

The Bluetooth core system consists of a host and one or more controllers. A host is a logical entity defined as all of the layers below the non-core profiles and above the host controller interface (HCI). A controller is a logical entity defined as all of the layers below HCI. An implementation of the host and controller may contain the respective parts of the HCI.

BLE's primary application is short distance transmission of small amounts of data so that the requirements can be characterized as low bandwidth. Unlike Bluetooth which is always on, BLE remains in sleep mode except for when a connection is initiated. This allows for minimal energy consumption and the ability to operate off a small on-board battery even in the event of a power outage.

Module Hardware

Module 122 of this embodiment uses wireless channel 120 which is implemented as a Bluetooth channel—specifically, Bluetooth Low Energy (BLE), which is a power-conserving variant of Bluetooth.

Figure 2:
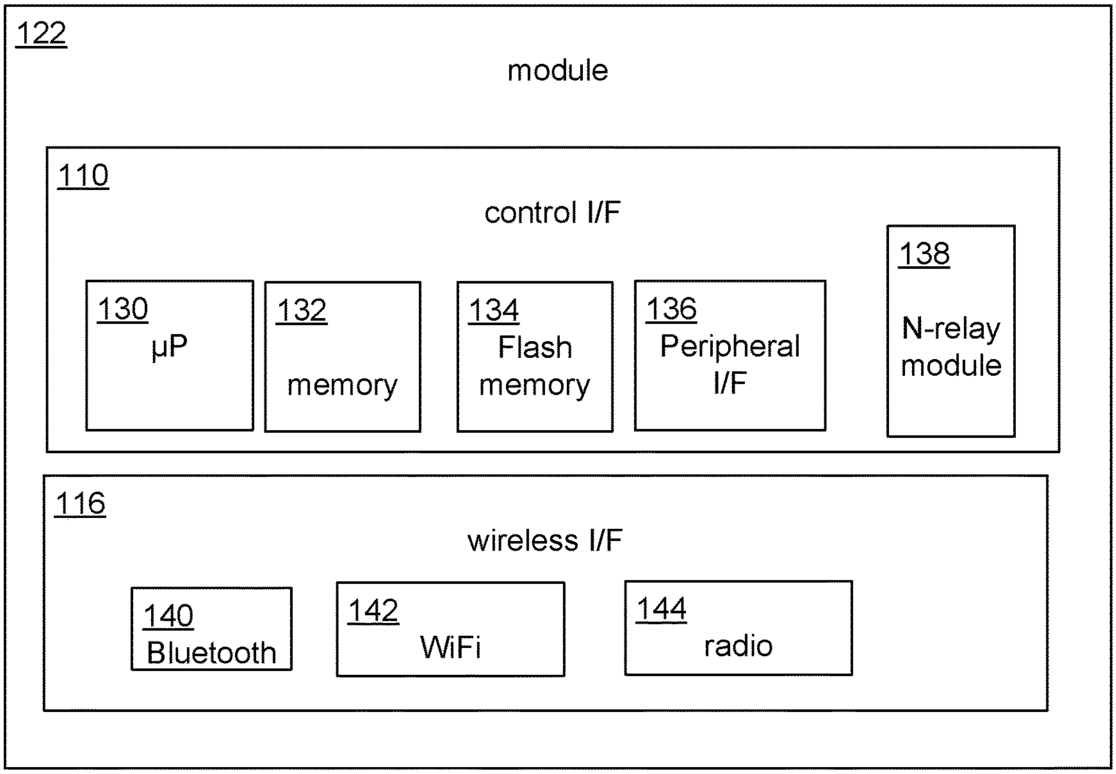
FIG. 2 is an enlarged schematic system block diagram depicting the main components of the module depicted in FIG. 1.

FIG. 2 is an enlarged schematic system block diagram depicting the main functional components of the module 122 depicted in FIG. 1. As shown, the control interface 110 of module 122 includes a microcontroller 130, memory 132, flash 134, peripheral interface 136 and a relay module 138 which may have multiple channels (N channels). In some embodiments, N may be 1, so that there is a single channel. In other embodiments, N may be two (2), three (3) or four (4) channels. In yet other embodiments, higher numbers of channels may be used.

In other embodiments, other functional blocks, such as cryptographic hardware acceleration block (not shown) for implementing well known cryptographic algorithms, low power management subsystems (not shown), additional storage and the like, can be included in module 122. In some embodiments, a secure client may be desired, having a "secure call" button for encrypted or secure communication. Many applications in military, bank vaults and related applications may include secure communications and related cryptographic functions.

The module 122 also includes the wireless interface 116 which includes a Bluetooth block 140, a Wi-Fi block 142 and a radio transceiver 144. The radio transceiver may be shared by the Bluetooth and Wi-Fi blocks 140, 142.

The relay module 138 may have multiple channels. A relay is an electrically operated switch that can be turned on or off, allowing current to go through or preventing current from going through respectively. A relay can be controlled with low voltages, such as 3.3V provided by the peripheral interface 136 and allows control of higher voltages like 12V, 24V or even mains voltage which is 230V AC in Europe and 120V AC in the US and Canada.

The use of module 122, in this embodiment, augments the existing operation of the traditional elevator functions of controller 106 without affecting the elevator's normal operation for users without the app 114.

Module 122*a*, 122*b* in the embodiment of FIG. 1, thus operate as equivalent button-pushes or presses on corresponding buttons on the car panel 104.

Non-limiting examples of chips that employ low-cost, low-power system-on-chip (SoC) microcontrollers with integrated Wi-Fi and dual-mode Bluetooth include the ESP32™ series developed by Espressif Systems.

As noted above, wireless channel 120 in the depicted embodiment is a BLE channel. When two devices Bluetooth device (e.g., module 122 and device 114*a*) communicate via a BLE channel, the device that holds the data (e.g., module 122) is defined as a server, and the device (e.g., device 114*a*) that obtains the data from the server is defined as a client.

In some embodiments, common operations between a server and a client are: (a) client sends data to a server by writing data into the server; (b) server sends data to a client by sending an "Indication" or "Notification" to the client; and (c) client can obtain data from the server by initiating a request to read data or a "Read Request".

In this embodiment, the module 122 may be configured to search for the closest Bluetooth signal; and send requests inquiring if the signal source is of interest, such as asking if the source is a call button. If the module 122 receives a secure message from the source, then the relay is closed. This is done through the app 114 whereby the relay switch is tripped only if a message is received. In other embodiments, a client-server architecture may be used where the module 122 may be configured as a server and the device 112 running app 114 may be configured as a client.

Mobile Device Hardware

Figure 3:
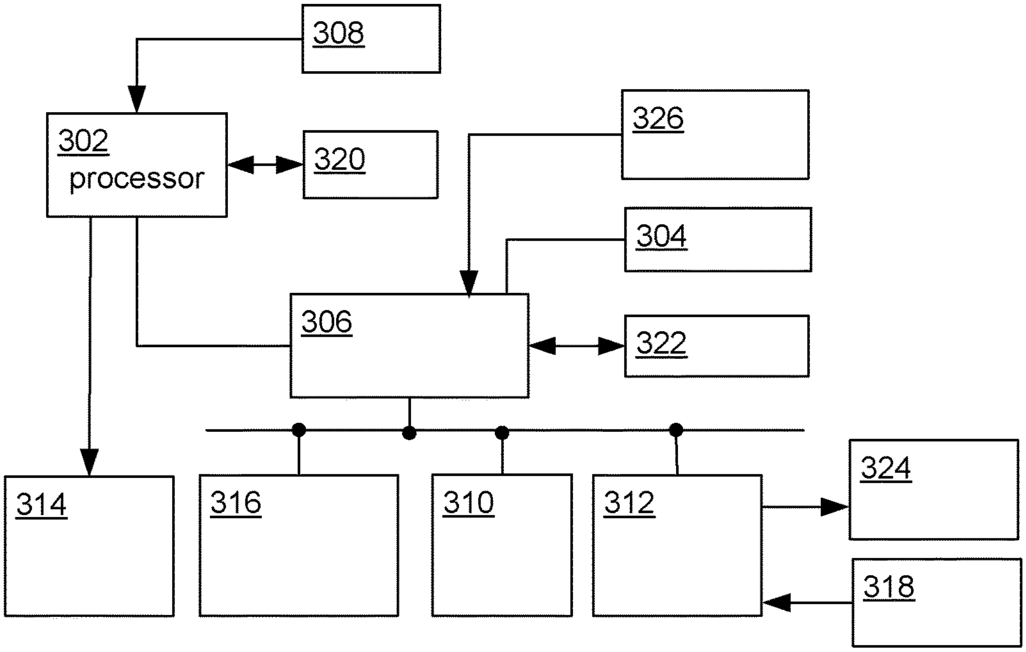
FIG. 3 is a simplified block diagram of hardware components of a mobile device communicating with the module shown in FIG. 1.

Referring to FIG. 3, and according to an embodiment of a device, there is depicted a simplified block diagram of device 112. Device 112 includes a processor 302 such as, but not limited to, a microprocessor, a memory medium 304, a touch input 308, a battery 320, and a display 314.

Processor 302 and memory medium 304 communicate with each other through an interface circuit 306. Interface circuit 306 also interconnects components including, but not limited to, a wireless network interface 316, a storage medium 310, an input-output (I/O) interface 322, a camera 326 and an audio codec 312. Audio codec 312 in turn connects to one of more microphones 318 and one or more speakers 324.

Wireless network interface 316 includes one or more of a wireless transceiver (e.g. Bluetooth™ transceiver), an infrared transceiver, or a cellular telephony transceiver. In the depicted embodiment, wireless network interface 316 includes a Bluetooth Lowe Energy transceiver.

I/O interface 322 may include one or more wired power and communication interfaces such as a USB port.

Input 308 may be a keypad or keyboard, a touch panel, a multi-touch panel, a touch display or multi touch display having a software keyboard or keypad displayed thereon.

The App

Figure 4A:
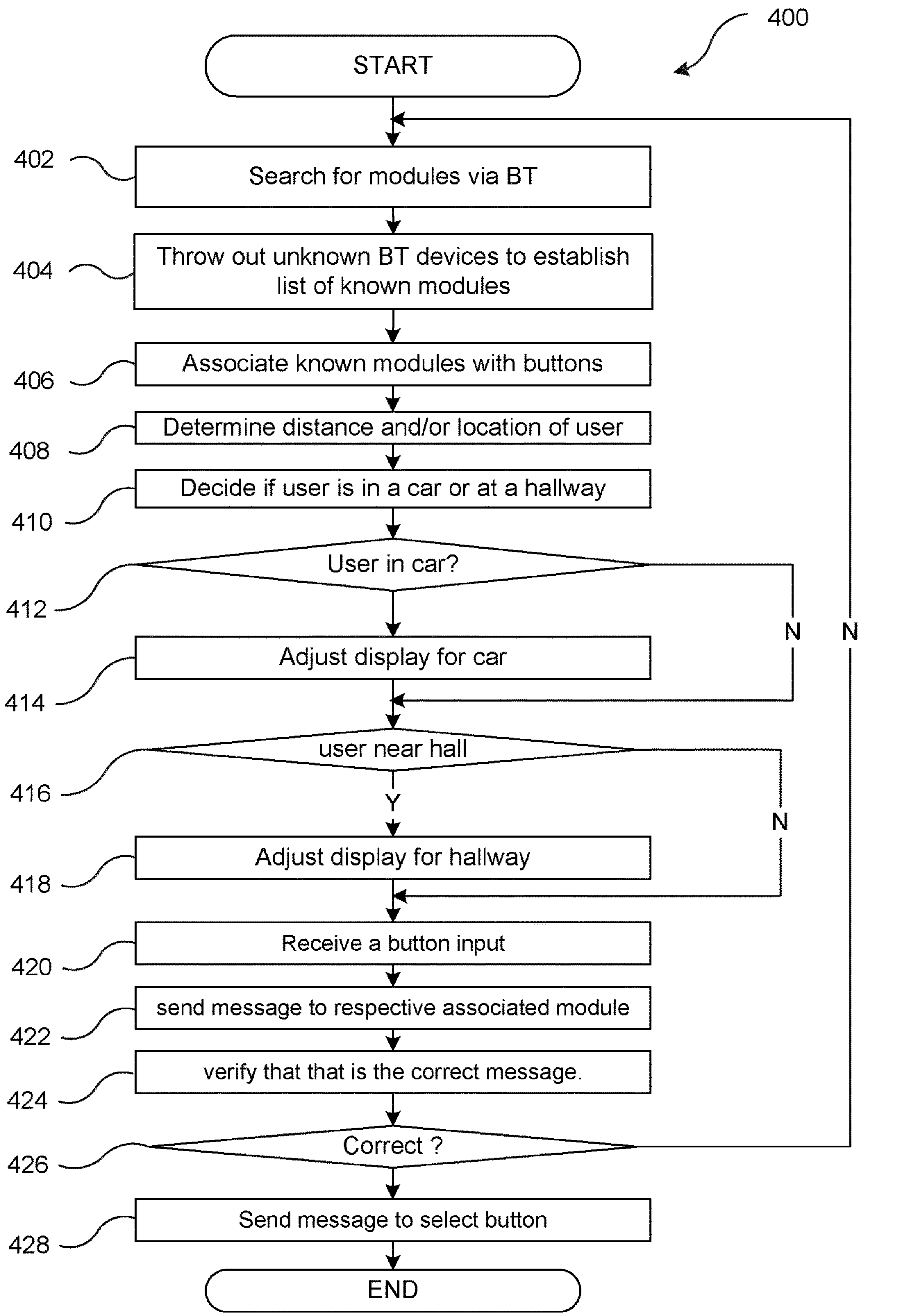
FIG. 4A is a flowchart illustrating exemplary procedural steps taken by one of mobile devices of FIG. 1, running a mobile application or an app.

In one embodiment, the app 114 creates an appropriate display depending on where the user is. This is illustrated as flowchart 400 in FIG. 4A.

Figure 5A:
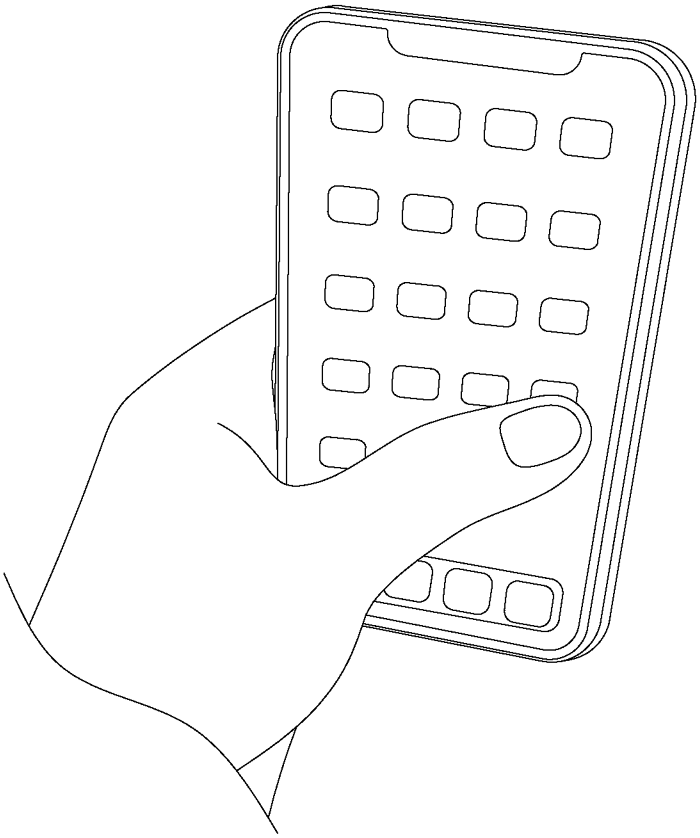
FIGS. 5*a*-5*j* are examples of user interface pages of the app corresponding to the steps of the flowchart of FIG. 4A and FIG. 4B.

At step 402 the app 114 undertakes a search, looking for all Bluetooth (BT) devices in the room. The associated user interface of the app 114 may look like the page shown in FIG. 5*g* or FIG. 5*h*.

Then, at step 404 the app 114 removes or throw outs all BT devices that are not known, and only lists known, or otherwise predetermined devices and associates them with buttons.

At step 406, app 114 associates known modules with buttons. At step 408 app 114 uses an algorithm to decide distance and location of user and at step 410 determines if the user is in car 108 or at calling unit at a hall.

Figure 5B:
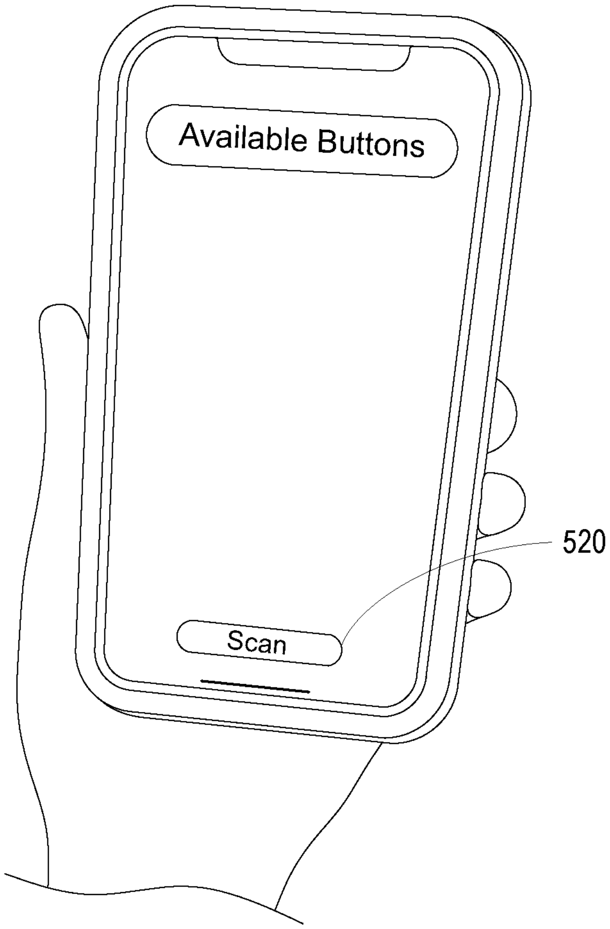
Figure 5C:
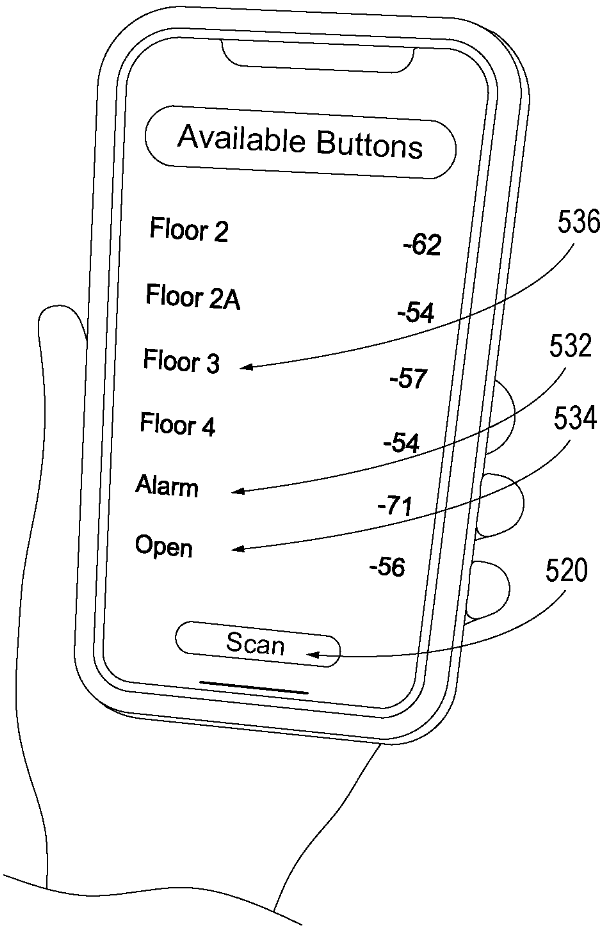
Figure 5D:
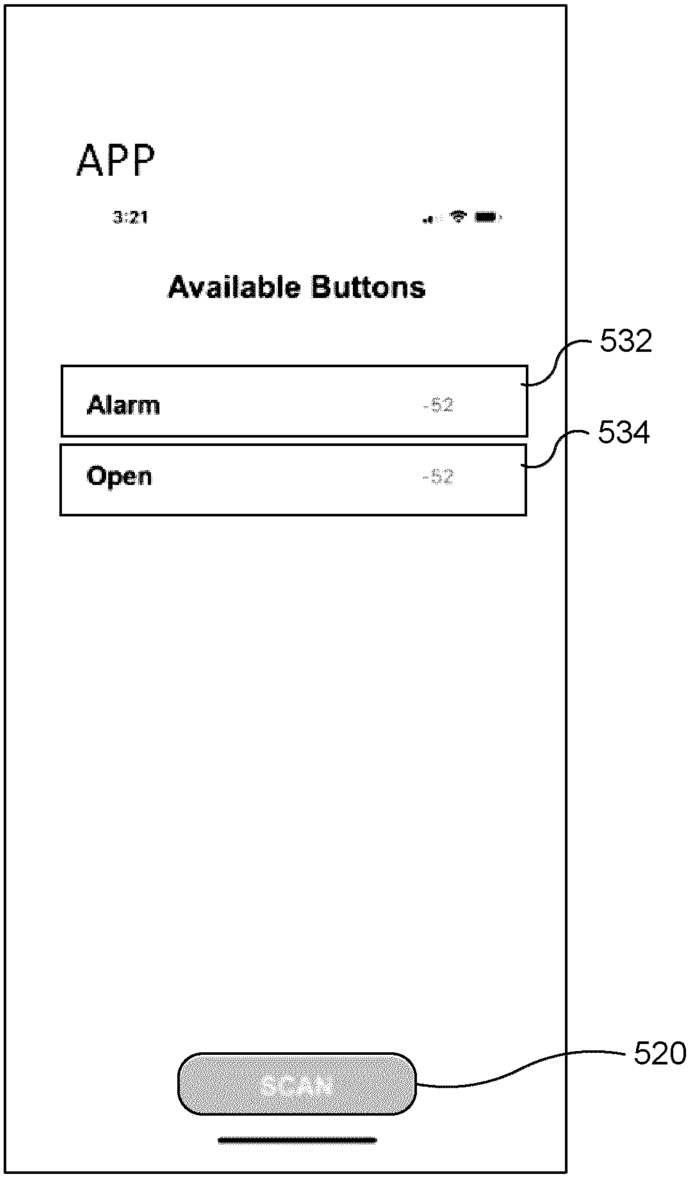
Figure 5E:
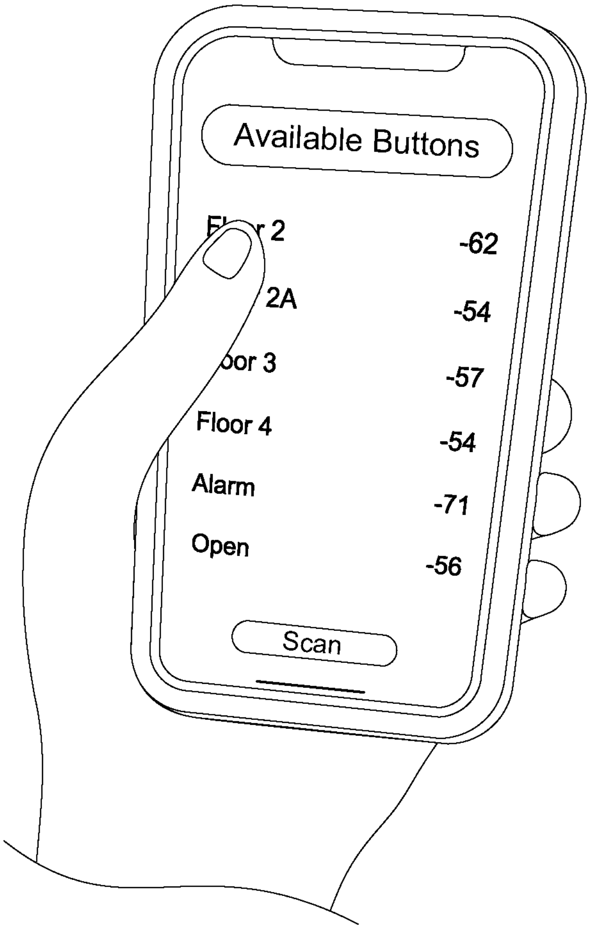
Figure 5F:
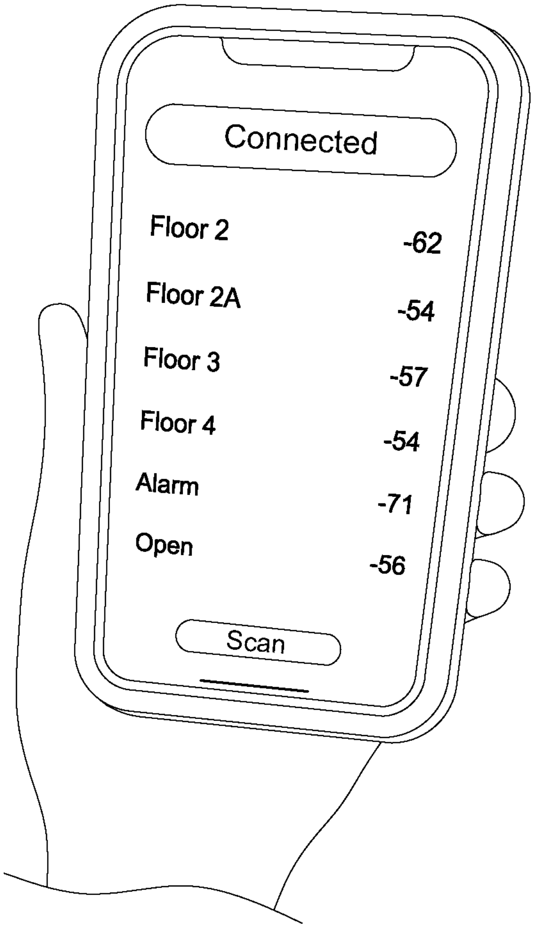
Figure 5G:
Figure 5H:

Upon such determination, the app 114 adjusts the display of related user interface shown as steps 412, 414, 416 and 418. If in car 108 for example, the app 114 will display the elevator panel buttons as shown in FIG. 5*j*, but will not display hall buttons or doors. As shown in FIG. 5*j*, only a subset of the physical panel may be displayed for suitable rendering while other buttons such as utility buttons may be viewed needed.

Figure 5I:
Figure 5J:

If in a hall on the other hand, then the user of app 114 does not display car panel buttons, but instead presents hall unit buttons as shown in FIG. 5*i* or a power door button. When the user chooses or selects a button, the app 114 receives the input (step 420) and sends message (step 422) to respective associated module 122 and verifies (step 424) that that is the correct message. If correct (step 426), then the button is selected (step 428). If the message is wrong (step 426), then the process starts again.

As will be appreciated by persons of skill in the art, these steps need not always be taken in the order presented.

Figure 4B:
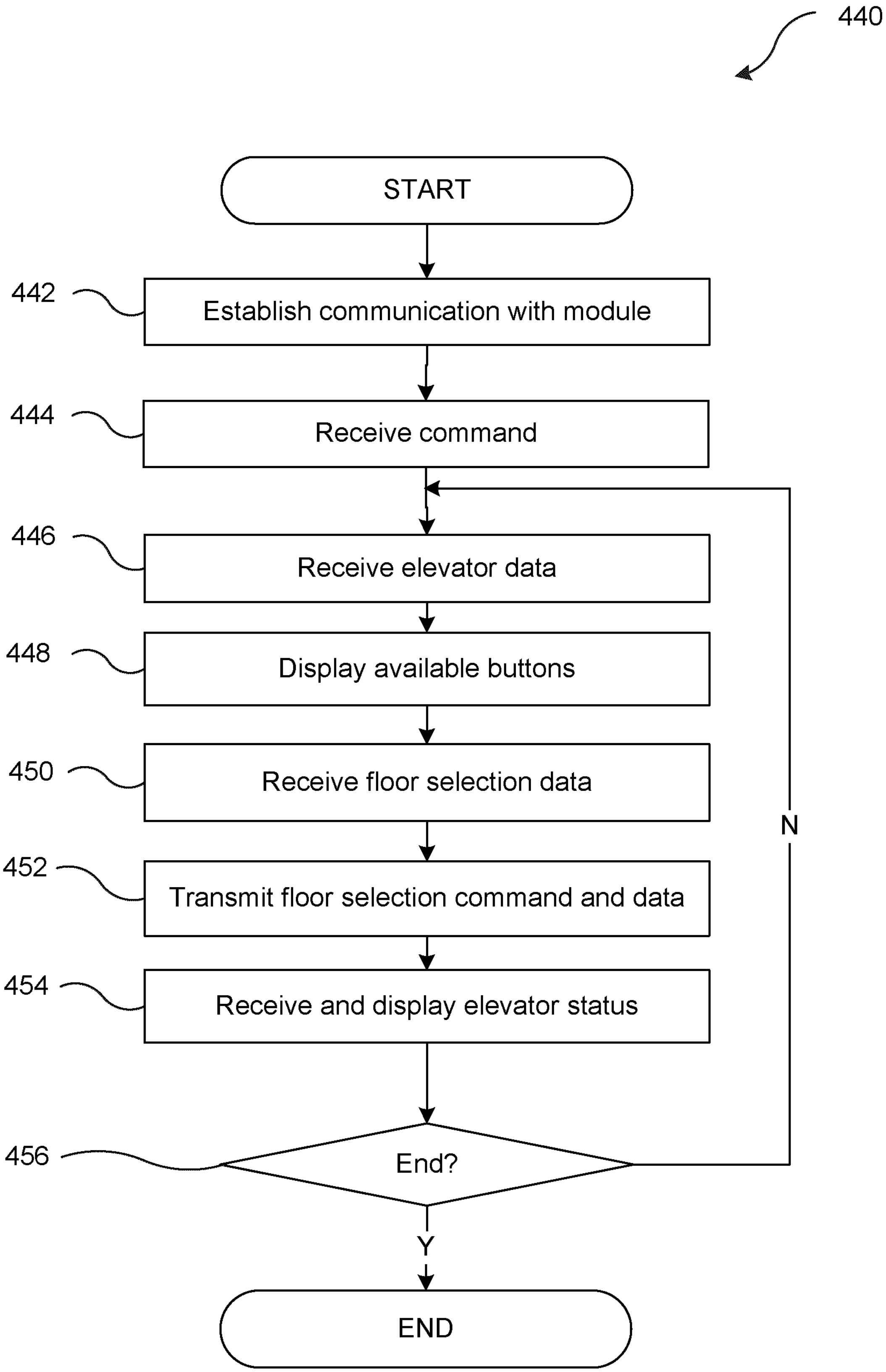
FIG. 4B is a flowchart illustrating another set of exemplary procedural steps taken by one of mobile devices of FIG. 1, running a mobile application or an app.

FIG. 4B depicts another flowchart 440 describing simplified process steps executed by processor executable instructions contained in app 114 in another exemplary embodiment. As contemplated in this embodiment, the app 114 is launched and establishes a communication channel with module 122 and (step 442) may display a screen indicating communication channel status. An example of a screen display page, depicting the launching of the app 114, is provided at FIG. 5*a*.

At step 444, the app 114 receives command via a button, to retrieve data representing elevator information. As depicted in FIG. 5*b*, to activate the command, a user may click on a "scan" button 520.

At step 444, the app 114 receives data representing elevator information. In the depicted embodiment, to activate the retrieval of data, app 114 first receives a button-click event, associated with button 520 which is depicted in FIG. 5*b*. The app 114 then executes a function or procedure associated with the event for the button 520.

At step 448, the app displays available buttons based on the data received at step 446. An example of a page that displays the available buttons is depicted in FIG. 5C.

Two exemplary buttons 532 and 534 denote "Alarm" and "Open" buttons respectively. A few other exemplary buttons such as button 536 denote labels for the various floors associated with the elevator system.

The app 114 permits custom labeling of its buttons and need not rely on the labels on the physical buttons assigned by the building or owner of the elevator system 100. This feature advantageously allows for simpler labelling and thus easy and convenient access to floors. For example, at infrequently visited buildings, uses may find that some physical buttons are labeled in a confusing, counter-intuitive, faded, duplicated or in an otherwise difficult-to-understand manner. Ease of translation to other languages and ease of relabeling are other advantages of using the software buttons of app 114.

As would be appreciated by persons of skill in the art, many other types of buttons may also be implemented including for example, "back door open", "up", "down", various elevator car selection buttons and the like.

Examples of app pages include those depicted in FIG. 5*c*, and FIG. 5*d*. In these depicted embodiments of the user interface pages, the page in FIG. 5*c* is typically displayed by app 114.

The user may be outside in a hallway waiting for an elevator car when the open button 534 is depressed. The user interface pages of app 114 may be changed when inside an elevator car so that some buttons may no longer be displayed, or others added. Buttons such as button 538 denote labels for the various floors when present.

In some embodiments, there may only be one destination floor. In such situations the app page depicted in FIG. 5*d* may be displayed. That is, clicking on the open button 534 is equivalent to selecting the destination floor if there is only one destination floor.

Figure 5K:
FIG. 5*k* depicts an example of a user interface page of the app corresponding to a stop request at a public transit vehicle.

In other embodiments, a stop request button for public transportation such as buses, streetcars, subways, light-rails and trams may be equipped with contactless access as demonstrated in the embodiments described herein. An example of a user interface for requesting a stop at a public transit vehicle is displayed in FIG. 5*k*.

In operation, a user installs an app, such as app 114, on to his or her device, such as device 112, and executes the app on his or her device. Upon receiving input from the user, the mobile app 114 instructs the mobile device 112 to transmit the associated command data wirelessly to the transceiver 144 of module 112 via its own wireless network interface 316. Upon the transceiver 144 receiving the command data, the microcontroller 130 of the control interface 110 is configured to send a corresponding command signal to the panel 122 to activate a relay switch.

Embodiment II—Powered Door

Figure 6:
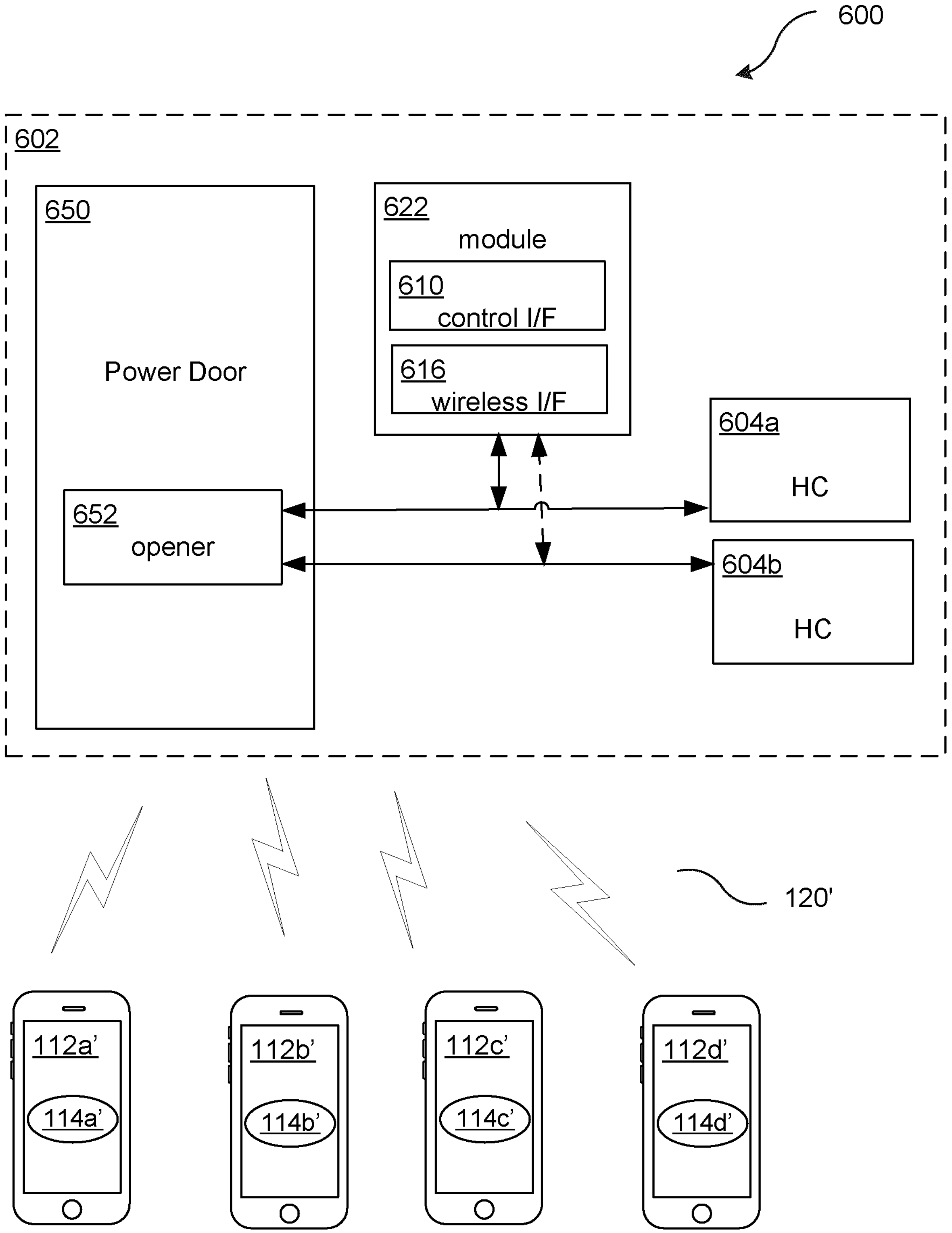
FIG. 6 is a schematic system block diagram of a powered door system, according to another embodiment of the present invention.

FIG. 6 depicts a simplified block diagram according to another embodiment of a powered door system 600. As depicted in FIG. 6, the powered door system 600 includes a powered door assembly 602 having at least one door 650 controlled by an opener 652. The powered door system 600 also includes handicap push buttons 604*a* and 604*b* (individually and collectively—buttons 604).

Opener 652 includes a motor and electrical interface to each of the buttons 604, and further provides operational control of the powered door 650. In this embodiment, some or all of the buttons 604 may be in wired communication with the opener 652. The module 622 may be interconnected between the opener 652 and one or both of the buttons 604 to provide contactless access.

The module 622 includes a control interface 610 and a wireless interface 616. The control interface 610 is used to communicate with opener 650 while the wireless interface 116 provides a wireless data communication interface with one or more electronic devices 112*a*' to 112*d*' (individually and collectively, "devices 112'") via a wireless channel 120'.

Again, in operation, a user installs an app, such as app 114', on to his or her device and executes the app to activate the powered door 150 from his or her device 112'.

Figure 7:
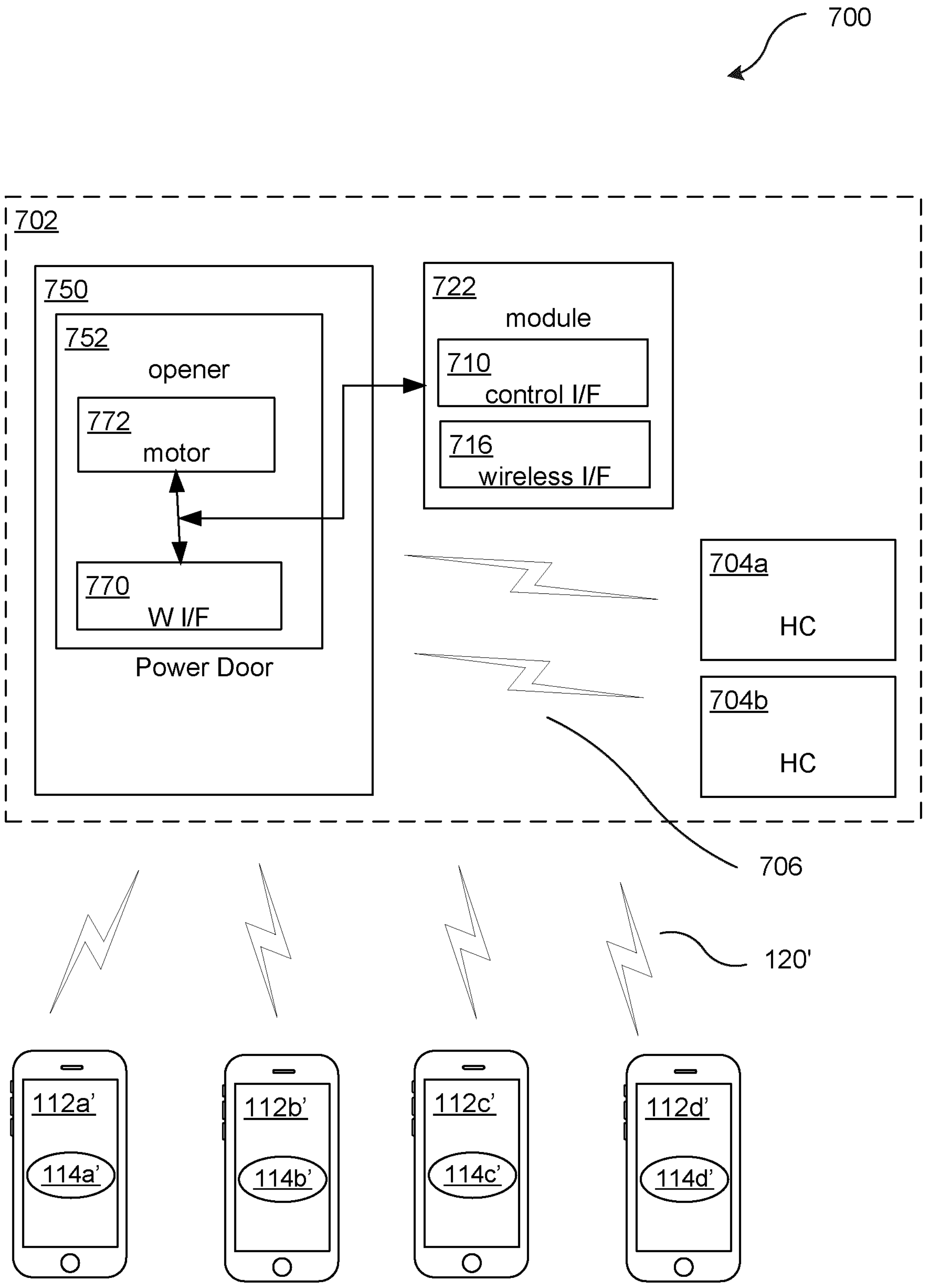
FIG. 7 is a schematic system block diagram of a powered door system, similar to that of FIG. 6 but having a wireless R/F subsystem, according to yet another embodiment of the present invention.

FIG. 7 depicts another simplified block diagram according to another embodiment of a powered door system 700. As depicted in FIG. 7, the powered door system 700 includes a powered door assembly 702 having at least one door 750 controlled by an opener 752, as well as handicap push buttons 704*a* and 704*b* (individually and collectively—"buttons 704"). The powered door system 700 also includes electronic devices 112*a*' to 112*d*' (individually and collectively, "devices 112'") via a wireless channel 120'.

Opener 752 includes a motor 772 and an interface 770 to each of the buttons 604. The interface 770 may be wireless and may interconnect to the buttons 704 via for example, R/F link 706. Opener 752 further provides operational control of the powered door 750. The module 722 may be interconnected between the motor 772 and the interface 770 to provide contactless access bypassing the need to physically press or touch the buttons 704*a*, 704*b*.

The module 722, which is similar to module 622, also includes a control interface 710 and a wireless interface 716. The control interface 710 is used to communicate with opener 750 while the wireless interface 716 provides a wireless data communication interface with one or more electronic devices 112*a*' to 112*d*' via a wireless channel 120'.

General:

It is contemplated that users of the device 112 and app 114 in the elevator system described herein may engage the app with a high degree of flexibility and customizability. The system offers a new type of engagement with accessible transportation or people-moving systems that is particularly useful, even for the general public, in times of pandemics such as COVID-19.

Although detailed exemplary embodiments have been discussed in relation to a BLE channel, in other embodiments, the channel can be any other suitable wireless channel or network including, but not limited to, a cellular data network, Wi-Fi™, Bluetooth™, WiMax™, IEEE 802.16 (WirelessMAN), and any suitable alternative thereof.

Although detailed exemplary embodiments have been discussed in relation to elevator systems, those of skill in the art will readily understand that the invention is not confined to just elevators but may be used to provide access to other systems such as powered doors, escalators, tunnels, parking, secure doors, airport lines and the like. The contemplated embodiments include, but are not limited to, a stop request button for public transportation such as buses, streetcars, subways, light-rails and trams; and associated stations or stops; elevator call buttons in hallways and elevator cars; escalators; moving walk-ways at airports and train stations; push-buttons at pedestrian walk signals and the like.

It is contemplated that any part of any aspect or embodiment discussed in this specification may be implemented or combined with any part of any other aspect or embodiment discussed in this specification. While particular embodiments have been described in the foregoing, it is to be understood that other embodiments are possible and are intended to be included herein. It will be clear to any person skilled in the art that modification of and adjustment to the foregoing embodiments, not shown, is possible.

Unless defined otherwise, all technical and scientific terms used herein have the same meaning as is commonly understood by one of ordinary skill in the art to which this invention belongs. In addition, any citation of references herein is not to be construed nor considered as an admission that such references are prior art to the present invention.

The scope of the claims should not be limited by the example embodiments set forth herein, but should be given the broadest interpretation consistent with the description as a whole.

What is claimed is:

1. A method for remotely operating an electromechanical apparatus via a wireless network, the method comprising:

(a) providing a device configured to electrically couple to the electromechanical apparatus:

(i) the electromechanical apparatus comprising a panel having at least one button, each button interconnected to a corresponding contact relay, each the button for operating the electromechanical apparatus via a controller, wherein each corresponding contact relay is configured to activate upon said each button being pressed;

(ii) the device comprising:

(A) a control interface configured for electrical coupling to the each corresponding contact relay of the electromechanical apparatus; the control interface comprising: a microcontroller, memory, and one or more relay switches coupled to the microcontroller; and (B) a transceiver configured to receive command data wirelessly directly from a mobile device, the transceiver interconnected to the control interface, the command data for use in operating and controlling the electromechanical apparatus;

(b) electrically coupling the control interface to the controller, such that each of the one or more relay switches is operable to electrically couple to the corresponding contact relay; and (c) providing a mobile application that is downloadable to the mobile device and that is configured to receive and access data pertaining to the operation and control of the electromechanical apparatus;

wherein the mobile application is configured to instruct the mobile device to transmit the command data wirelessly to the transceiver, and wherein the microcontroller of the device is configured to, upon the transceiver receiving the command data, send a corresponding command signal to operate a corresponding one of the relay switches thereby activating the corresponding contact relay equivalent to a button-press on the corresponding button, whereby the device augments existing operation of the electromechanical apparatus without affecting existing traditional modes of operation of the electromechanical apparatus.

2. The method as claimed in claim 1, wherein the mobile application is configured to:

(d) receive selection data from a user; and (e) in response to receiving the selection data, transmit the command data, said command data corresponding to the selection data.

3. The method as claimed in claim 2, wherein the mobile application is further configured to establish communication with the device prior to receiving the selection data from the user.

4. The method as claimed in claim 2, wherein, prior to receiving the selection data from the user, the mobile application is further configured to:

(f) receive elevator data; and (g) display a page on the mobile device, based on the elevator data, wherein the selection data is generated in response to user input on the page.

5. The method as claimed in claim 1 or 2, wherein the electromechanical apparatus is selected from the group consisting of an elevator and a powered door.

6. The method of any one of claims 1 to 4, wherein the transceiver is a Bluetooth transceiver.

7. The method of claim 6, wherein the Bluetooth transceiver is a Bluetooth low energy (BLE) transceiver.

8. A device for remotely operating an electromechanical apparatus via a wireless network, the device comprising:

(i) a control interface configured for electrical coupling to at least one contact relay of the electromechanical apparatus, the control interface comprising:

a microcontroller, memory, and one or more relay switches coupled to the microcontroller; and (ii) a transceiver configured to receive command data wirelessly directly from a mobile device, the transceiver interconnected to the control interface, the command data for use in operating and controlling the electromechanical apparatus;

wherein each of the one or more relay switches is operable to electrically couple to a corresponding contact relay; and wherein the microcontroller of the device is configured to, upon the transceiver receiving the command data wirelessly from a mobile application running on the mobile device, send a corresponding command signal to operate a corresponding one of the relay switches thereby activating the corresponding contact relay equivalently to a button-press on the corresponding button of the electromechanical apparatus, such that the device augments existing operation of the electromechanical apparatus without affecting existing traditional modes of operation of the electromechanical apparatus.

9. The device of claim 8, wherein the transceiver is a Bluetooth transceiver.

10. The device of claim 9, wherein the Bluetooth transceiver is a Bluetooth low energy (BLE) transceiver.

11. The device of claim 8, wherein the electromechanical apparatus is selected from the group consisting of an elevator and a powered door.

* * * * *